United States Patent [19]

Breitholz et al.

[11] 4,221,499

[45] Sep. 9, 1980

[54] VIBRATORY DEVICE

[75] Inventors: Claes Breitholz, Lyckeby; Rolf Dahlin, Vällingby, both of Sweden

[73] Assignee: Dynapac Maskin AB, Solna, Sweden

[21] Appl. No.: 900,785

[22] Filed: Apr. 28, 1978

[30] Foreign Application Priority Data

Apr. 29, 1977 [SE] Sweden ............................... 7705001

[51] Int. Cl.² ....................... E01C 19/23; F16H 33/10

[52] U.S. Cl. ........................................ 404/117; 74/87; 366/128

[58] Field of Search ......................... 74/87; 209/366.5; 366/128; 404/117

[56] References Cited

U.S. PATENT DOCUMENTS

| | | | |
|---|---|---|---|
| 843,067 | 2/1907 | Bowsman | 74/87 X |
| 999,563 | 8/1911 | Hughes | 209/366.5 |
| 1,242,824 | 10/1917 | Lindsay | 366/128 X |
| 1,392,465 | 10/1921 | Thompson | 74/87 |
| 3,145,631 | 8/1964 | Green | 74/87 X |
| 3,966,344 | 6/1976 | Haker et al. | 404/117 |

FOREIGN PATENT DOCUMENTS

| | | | |
|---|---|---|---|
| 525770 | 11/1974 | U.S.S.R. | 404/117 |

*Primary Examiner*—Allan D. Herrmann
*Attorney, Agent, or Firm*—Brumbaugh, Graves, Donohue & Raymond

[57] ABSTRACT

An easily adjusted vibratory device useful, for example, on soil compacting vibratory rollers. One or more mass elements are supported eccentrically on a rotating shaft. The mass elements are pivotal about a pivotal axis or shaft perpendicular to the rotating shaft. Pivoting the mass elements during rotation of the shaft moves the center of gravity of the mass elements toward or away from the rotating shaft and thereby continuously alters the magnitude of the centrifugal force acting on the mass elements to cause vibration. The mass elements are formed, with respect to the pivotal shaft, to minimize the force necessary to pivot the elements by maintaining the moment arms from the axis of the pivotal shaft to the centrifugal force resultant at or near zero. In a specific embodiment the rotating shaft is cylindrical, the mass elements and pivotal shaft are supported within the rotating shaft. An axially moveable plate within the rotating shaft is connected along the axis of the rotating shaft to an adjusting mechanism that moves the plate axially. The plate engages the mass elements and pivots them to adjust continuously the vibration amplitude.

13 Claims, 5 Drawing Figures

VIBRATORY DEVICE

BACKGROUND OF THE INVENTION

This invention relates to a vibratory device and more particularly to a vibratory device including one or more mass elements or weights arranged on a rotating shaft and pivotal in relation to this shaft and adjusting devices interacting with these elements for the purpose of achieving a continuously variable vibration amplitude while the shaft is rotating.

The use of adjustable eccentric weights on soil compacting machines, for example, to adapt the vibration amplitude of the machine to the nature of the compacted surface is already known. In this connection the capability of carrying out adjustment while the machine is in motion and by means of controls that can easily be operated by the driver of the machine is desirable. It is also desirable for such adjustment to be made continuously rather than in steps, while the shaft is rotating, and independently of the direction of rotation of the eccentric shaft.

On constructions so far known, attempts have been made to meet these requirements by means of complicated and consequently expensive mechanisms for adjusting the vibration amplitude and maintaining it in the readjusted position. Since in many cases the vibrational forces required are large, correspondingly large forces occur in the adjusting mechanism which give rise to problems associated with the dimensions of the mechanism.

SUMMARY OF THE INVENTION

The purpose of the present invention is to eliminate the foregoing disadvantages and achieve a device for continuous adjustment of the vibration amplitude in which stresses arising in the adjusting mechanism are reduced to a minimum.

Furthermore, the purpose of the invention is to achieve a vibrational device in which the plane, at right angles to the axis of rotation, containing the vibration-generating contrifugal force resultant acting on the mass elements and rotating with the shaft, shall, for each mass element and all vibration amplitudes set with the adjusting mechanism, intersect the axis of rotation at the same or practically the same point. This is important in connection with the practical application of the invention on vibratory rollers, for example. In this way it is possible, in order to impart a vibratory motion to the roller drum, to use only one eccentric element if it is positioned with its adjusting or pivotal axis in a plane that passes through the center of gravity of the drum and at right angles to its axis of rotation. The centrifugal force resultant acting on the rotating eccentric elements or mass elements will consequently always be in this plane through the center of gravity of the drum. Or, in other words, the resultant will not be displaced axially on readjustment of the vibration amplitude with the result that the drum is not subjected to any rocking forces during rotation of the eccentric shaft.

BRIEF DESCRIPTION OF THE DRAWINGS

In the following, the invention will be described in greater detail with reference to the appended drawings where.

DESCRIPTION OF PREFERRED EMBODIMENTS

Figure 1:
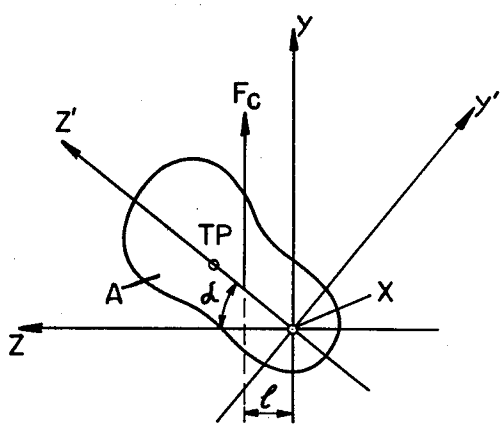
FIG. 1 is a diagrammatic illustration that shows an arbitrarily shaped mass element, the axis of rotation and pivotal axis of which have been inserted in a perpendicular system of coordinates x, y, z.

In FIG. 1 an arbitrarily shaped mass element A is inserted in a perpendicular system of coordinates x, y, z with the x-axis at right angles to the plane of the paper and the y-axis and z-axis in the plane of the paper. The element A pivots on a shaft that coincides with the x-axis of the system of coordinates. The z-axis coincides with the axis of rotation of the mass element and the y-axis, finally, is at right angles to this axis. The center of gravity of the mass element is designated TP and through this and the zero point of the system an axis z' has been inserted which forms the angle $\alpha$ with the z-axis. At right angles to the z' axis in the same plane as the paper and passing through the zero point, an additional coordinate axis y' has finally been inserted. Centrifugal forces, the resultant of which is designated $F_c$, act on the mass element when it rotates about the z-axis.

In accordance with the invention the centrifugal force resultant $F_c$ can, by a special design of the mass element, be placed at an arbitrary distance l from the y-axis regardless of the angle $\alpha$. In particular, $F_c$ can be made to coincide with the y-axis or can be placed as close to it as is desired, which means that the necessary forces for adjusting the mass element A in order to bring about a change in the vibration amplitude need only be very small even where large centrifugal forces $F_c$ are involved. In theory, it should be possible to eliminate the adjusting force altogether and consequently the stresses in the adjusting mechanism if $F_c$ is made to coincide with the y-axis for all values of $\alpha$.

In accordance with the known laws of machanics the centrifugal forces acting on the mass element A in FIG. 1 when the element rotates about the Z-axis can be replaced by a resultant $F_c$, acting along the y-axis and in the y-z-plane, of a magnitude in accordance with the following formula:

$$F_c = mw^2 z'_{TP} \sin\alpha$$

m = mass of the element w = angular velocity of the element round the z-axis $z'_{TP}$ = distance from the center of gravity of the element to the axis of rotation, the x-axis $\alpha$ = the angle between the axes z and z'.

$F_c$ is also at a distance along the z-axis from the axis of rotation which in the Figure is designated l, the magnitude of which can be calculated by the following formula:

$$l = [(I_{y'} - I_{z'})/mz'_{TP}]\cos\alpha$$

where $I_{y'}$ and $I_{z'}$ designate the mass-moment of inertia of the element A around the axes indicated by the respective index.

By bringing $I_{y'} - I_{z'}$ sufficiently close to 0, can also be made as small as desired without this affecting the magnitude of $F_c$. A low value of l helps to reduce the adjusting force exerted on the mass element in connection with changing the vibration amplitude.

The best results will of course be obtained by eliminating l completely. However, in a practical application of the invention it may happen that departures are made from the conditions theoretically premised. Although such a departure will certainly result in an increase of the necessary adjusting force and consequently increased stress on the adjusting mechanism, the increase resulting from a limited departure is not so great that practical versions displaying only small departures from the theoretical conditions cannot be considered to fall within the framework of the main purpose of the invention, namely to reduce to a minimum the force necessary for adjusting the amplitude.

Practical tests show that a mass element giving a value of the expression $(I_{y'}-I_{z'})/mz'_{TP} < 0.2z'_{TP}$ in the above formula at a distance l can be considered to be within the framework of the invention. For the distance l this condition gives the equivalent condition $l < 0.2z'_{TP} \cos\alpha 0.2z'_{TP}$, which shows that for a mass element falling within the framework of the invention the distance from the centrifugal force resultant to the adjusting axis of the element is 1–5 times smaller than the distance from the center of gravity of the element to the same axis.

Other departures from ideal mass element conditions as shown in FIG. 1 which may give rise to moments about the pivotal axis of the element comprise the element's deviation moment $D_{y'z'}$ in respect to the axis intersection y'z'. If this moment deviates from 0 it will give rise to a moment about the pivotal axis of the element, the x-axis, according to the following formula:

$$M_D = -w^2 D_{y'z'}(\cos^2\alpha - \sin^2\alpha).$$

In the case of a mass element with $|D_{y'z'}| < 0.1m(z'_{TP})^2$ the moment $M_D$ will be numerically about as large as that previously allowed for $I_{y'}-I_{z'} \neq 0$ and with $l \leqq 0.2z'_{TP}$.

An additional criterion which may give rise to a moment about the pivotal axis of the element A is its distance from the axis of rotation. A minimum distance f (not shown) between the axis of rotation and the pivotal axis of the element gives, with reference to FIG. 1, a moment $$M_f = -mw^2 f z'_{TP} \cos\alpha.$$

If the condition $f < 0.1z'_{TP}$ is inserted, a moment will be obtained that can be compared numerically with the one previously allowed for $I_{y'}-I_{z'} \neq 0$ and $l < 0.2z'_{TP}$.

The above conditions for the shape of the mass element and its journalling in relation to the axis of rotation can be summarized in one condition, namely $$2f + \frac{|I_{y'} - I_{z'}| + 2|D_{y'z'}|}{mz'_{TP}} < 0.2z'_{TP}$$

For each of two deviations =0 the condition according to this combined formula will be approximately the same as earlier separately established conditions for the remaining finite deviation.

Figure 2:
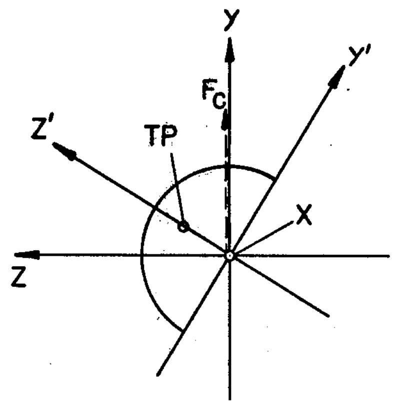
FIG. 2 is a further diagrammatic illustration that shows in schematic form an example of mass element design according to the invention.
Figure 3:
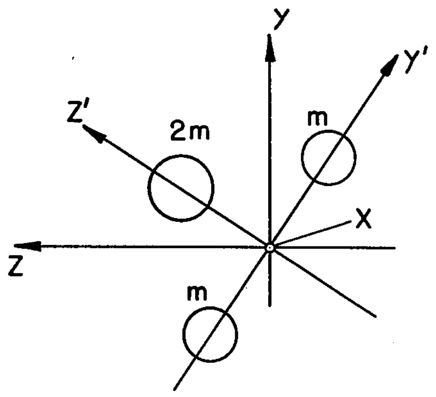
FIG. 3 is a diagrammatic illustration of another example of mass element design according to the invention.

Examples of mass elements fulfilling the theoretically proposed conditions $I_{y'}-I_{z'}=0$ and $D_{y'z'}=0$ are shown in FIGS. 2 and 3. FIG. 2 shows a semicylinder and FIG. 3 an element the mass of which is concentrated in three parts, two of size m and one of size 2 m, rigidly connected with each other.

Figure 4:
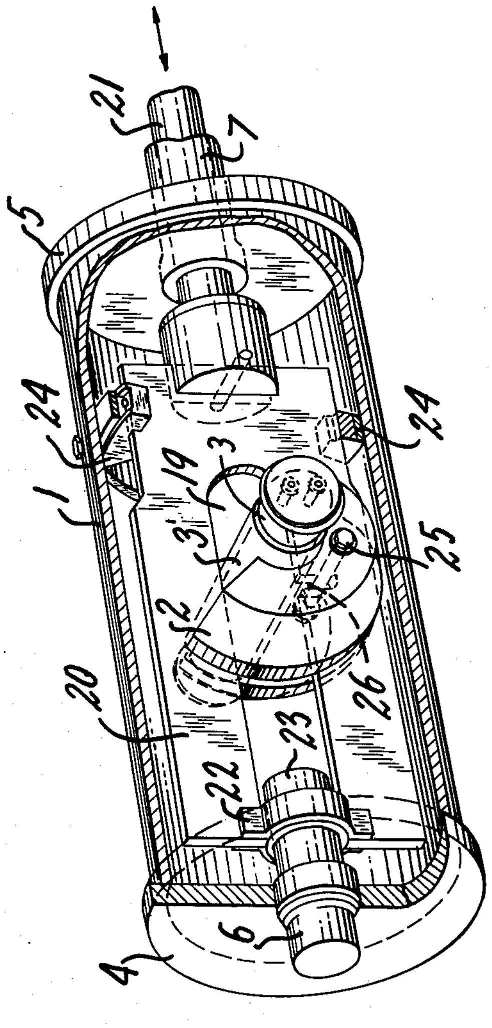
FIG. 4 is a perspective view and illustrates a practical application of the invention.

The practical application of the invention as shown by the version depicted in FIG. 4 includes a rotating shaft 1 in the shape of a tube inside which a mass element 2, affixed to a sleeve 3', is pivoted on a pivotal shaft 3 passing through the centerline of the tubular shaft and at right angles to it. The tubular shaft 1 is limited axially by means of two end plates 4 and 5, each of which is equipped with a centrally arranged and outwardly protruding stub axle 6 and 7 respectively. The ends of the shaft 3 are connected to the tubular shaft 1.

Figure 5:
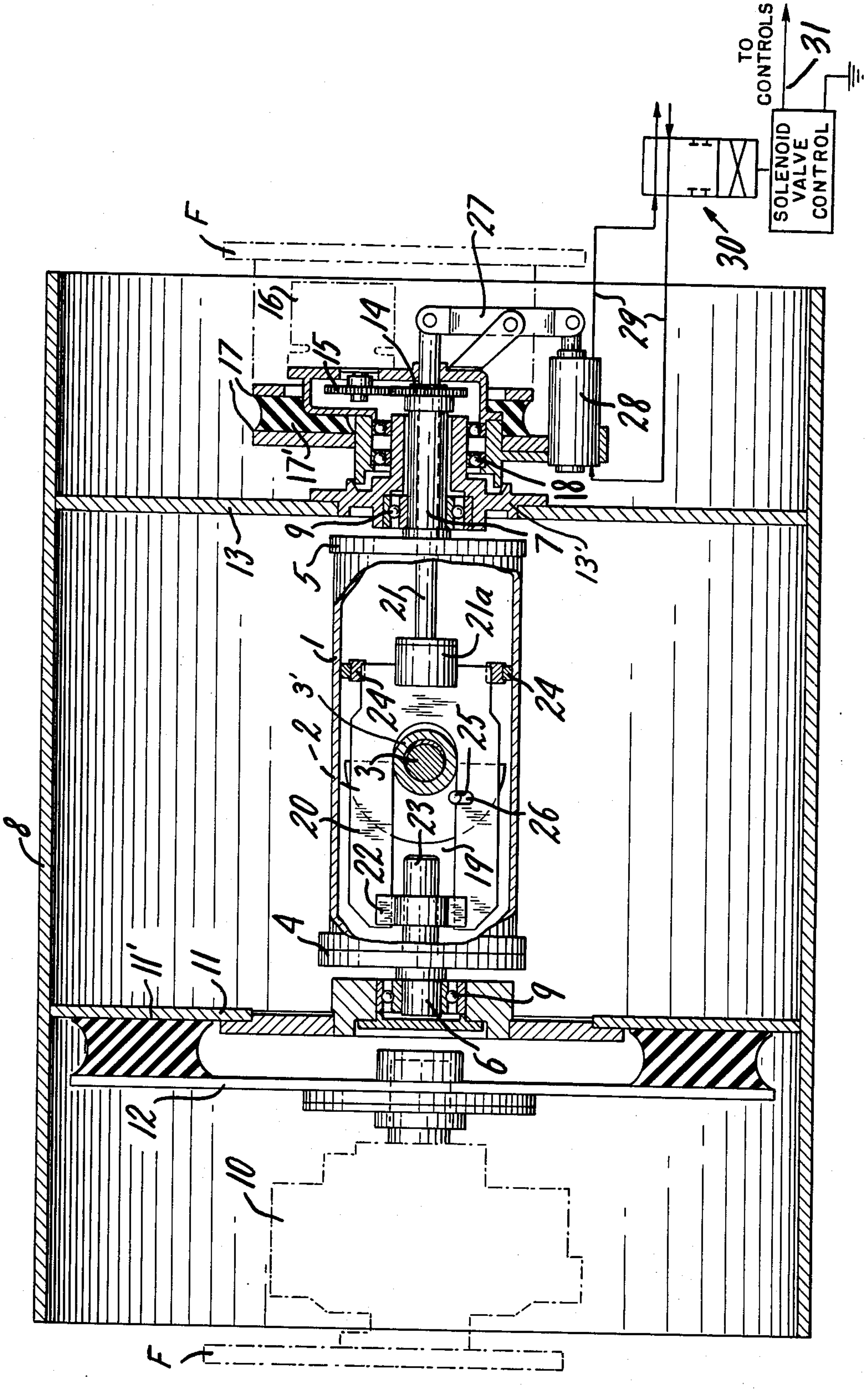
FIG. 5, finally, is an axial cross-section view of a vibratory roller inside which the vibration device shown in FIG. 4 is mounted.

The two stub axles 6 and 7 serve as shaft journals for the rotating shaft 1, and in the practical example shown in FIG. 5 the rotating shaft is journalled in the end plates of a vibrating drum 8.

The stub axle 6 is thereby journalled in a bearing 9 on the drive side of the drum. Drum drive is accomplished by means of a hydraulic motor 10 mounted in the drum frame F which transmits the drive to the drum 8 by means of a drive pulley 12 that is resiliently attached to the drum end plate 11 by means of a rubber or rubber-like element 11'.

The stub axle 7 arranged at the opposite end of the tubular shaft 1 is journalled in the bearing 9 in the drum end plate 13 and extends some distance beyond it. The stube axle is tubular and at its outer end carries a gear 14. Via this gear and a gear transmission 15 the rotating shaft 1 is driven by a hydraulic motor 16 mounted in a part 17 that is resiliently attached to the drum frame F by means of a rubber or rubber-like element 17'. The stub axle 7 extends through a hub 13'. The hub 13' is in the bearing 18 journalled so as to rotate in the part 17 as illustrated in FIG. 5.

The mass element 2 pivoted inside the rotating shaft 1 is designed to generate vibrations during rotation of the shaft which, via the bearings 9, are transmitted to the drum 8. In order to permit this vibrational motion to be regulated, the eccentric moment of the mass element 2 is variable in relation to the rotating shaft by the element 2 being pivoted on the pivoting shaft 3. In the example shown, this is achieved with the aid of adjusting devices consisting of a plate 20 with a lenghtwise slot 19, that allows the plate 20 to be axially adjustable inside shaft 1. One end of the plate is fastened to a control rod 21 which protrudes into the shaft 1 through the tubular stub axle 7 and the end plate 5. The other end of the plate 20 is fitted with an annular control device 22 which makes a sliding fit round locating stud 23 that protrudes from the center of the end plate 4 into the shaft 1. The control device 22 can be a combination collar and bushing as shown in FIG. 4. In order to prevent plate 20 from rotating relative to the shaft 1, locating pieces 24 are affixed to the inner wall of the shaft and provided with slots **24*a*** in which the plate can slide.

Plate 20 is centrally arranged inside shaft 1 and so oriented that the pivoting shaft 3 of the mass element 2 passes through the slot 19 of the plate at right angles to its surface. Plate 20 can in this way be moved in the lengthwise direction of rod 21 without being obstructed by the pivoting shaft 3.

The mass element 2 may be suitably divided into two equally large halves arranged on each side of the plate 20 and mounted on the pivoting shaft 3. At some distance from the pivoting shaft and parallel with it the mass element 2 is equipped with a driver bar 25 which connects the two element halves with each other and extends transversely through a slot 26 provided in plate 20. When the plate is moved axially by means of control rod 21 a side of the slot 26 engages and moves the bar 25. The mass element 2 is caused by driver bar 25 to describe a pivoting movement which changes the eccentric moment of the element in relation to the rotating shaft 1 and consequently the amplitude of the vibrational motion that is generated during rotation of the shaft 1.

Control rod 21 can rotate in relation to plate 20, by means of a fitting 21*a* affixed to plate 2 as shown, and rotatably secured to the control rod 21. The opposite end of the control rod 21 is connected to a lever system 27 which, with the aid of a hydraulic cylinder 28, transfers the desired motion to the control rod. The hydraulic cylinder is supplied via hydraulic hoses 29 schematically illustrated, and the setting of a suitable control valve 30. This valve 30 can be, for example, a cylinder valve, and it is controlled from the driver's location or platform, not shown, on the roller, via one or more control wires 31. Hydraulic cylinders, control valves and electrical controls that are suitable for the purposes described are known in the art.

Owing to the small adjusting forces required for pivoted movement of the mass element, the size of the hydraulic system and the eccentric adjusting system can be kept to a minimum, which also reduces the risk of leakage in the hydraulic system, and in consequence the desired value of the eccentric moment of the mass element can be set with greater reliability.

The foregoing description of a preferred embodiment is exemplary and is not to be construed as limiting the scope of the invention. That scope is set forth in the appended claims.

We claim:

1. A vibrational device including at least one mass element, a rotatable shaft, means connecting said mass element eccentrically to the rotatable shaft for pivotal movement about an axis substantially perpendicular to the rotatable shaft, means for pivoting the mass element about the pivotal axis as the rotatable shaft rotates, whereby upon pivotal movement of the mass element the centrifugal force on said element is altered to alter continuously the amplitude of vibration of the vibration device, said means connecting and said at least one mass element being constructed and arranged so that said pivotal axis is proximate or intersects the line along which the mass element centrifugal force resultant acts for any pivotal position of the mass element.

2. The vibrational device of claim 1 wherein the rotatable shaft is a hollow cylindrical member, the means connecting said mass element is a pivot shaft substantially perpendicular to the axis of said rotatable shaft, within the rotatable shaft, and said means for pivoting the mass element comprises a member located within the rotatable shaft and moveable substantially only axially with respect to the rotatable shaft in engagement with the mass element to pivot the mass element and adjust the amplitude of vibration.

3. A vibrational device according to claim 1 wherein the means for continuously varying the vibration amplitude includes an adjusting member substantially symmetrical about the axis of rotation, means confining movement of the adjusting member to movement substantially only parallel the axis of rotation, and means on the mass element engageable by the adjusting member to pivot the mass element about the pivotal axis.

4. A vibrational device according to claim 3 wherein the adjusting member is a slotted plate, and a pivot shaft for the mass element extends through the slot therein and defines the pivotal axis.

5. A vibrational device comprising one or more mass elements on a rotatable shaft, journalled pivotally about a pivotal axis at right angles to the axis of rotation of the rotatable shaft, and means for continuously varying the vibration amplitude during rotation of the shaft by pivoting the one or more mass elements about the pivotal axis, the mass distribution and position of each mass element on its pivotal axis in relation to the axis of rotation satisfying the following conditions:

$$2f + \frac{|I_{y'} - I_{z'}| + 2|D_{y'z'}|}{m z'_{TP}} < 0.2 z'_{TP},$$

where

- f = the distance between the pivotal axis x and the axis of the rotatable shaft;
- $I_{y'}$ = the inertial moment of the mass element with regard to a first axis y' which is at right angles to the pivotal axis x;
- $I_{z'}$ = the moment of inertia of the mass element with regard to a second axis z' at right angles to the first axis y' and the pivotal axis x, and passing through the center of gravity TP of the mass element;
- $D_{y'z'}$ = the deviation moment of the mass element with regard to the above-mentioned axes y' and z';
- m = mass of the mass element; and
- $z'_{TP}$ = the distance from the center of gravity of the mass element to the pivotal axis x along the second axis z'.

6. A vibrational device as in claim 1, wherein the moment of inertia $I_{z'}$ of each mass element about the coordinate axis z' passing through the center of gravity of the element and at right angles to and through the pivotal axis x is substantially as large as its moment of inertia about the coordinate axis y' at right angles to both the z' axis and the pivotal axis x.

7. A vibrational device as in claim 1, wherein the deviation moment $D_{y'z'}$ of the mass element is substantially zero with regard to the coordinate axes y' and z'.

8. A vibrational device as in claim 1, further including a pivot shaft, the distance between the centerlines of the pivot and rotatable shafts of the mass element being substantially zero.

9. A vibrational device as in claim 1 or 8, each mass element comprising bodies displaying rotational symmetry about the pivotal axis, the two symmetrical halves of said bodies being defined by a plane containing the pivotal axis.

10. A vibrational device as in claim 5, further including adjusting means axially displaceable in relation to the rotatable shaft to any position within limits of its axial movement, and driver means interacting with the adjusting means for changing the eccentric moment of the mass element in relation to the rotatable shaft to any value within a continuous range corresponding to the range of positions of the adjusting means.

11. A vibrational device as in claim 10, characterized in that the rotatable shaft is of tubular shape along part of its length and that each mass element is pivoted inside the tubular part on a pivot shaft at right angles to the rotatable shaft.

12. A vibrational device as in claim 10 or 11, having one mass element, the device being mounted in the drum of a vibratory roller and the mass element being positioned with the axis of the pivot shaft in a plane that passes at least approximately through the center of gravity of the drum at right angles to its axis of rotation, and having a plane at right angles to the rotatable shaft, containing a vibration-generating centrifugal force resultant that rotates with the shaft and acts on the mass element, and for all vibration amplitudes set with said adjusting means intersecting the rotatable shaft at substantially the same point.

13. A vibrational device comprising one or more mass elements on a rotatable shaft, journalled pivotally about a pivotal axis at right angles to the axis of rotation of the rotatable shaft, and means for continuously varying the vibration amplitude during rotation of the shaft by pivoting the one or more mass elements about the pivotal axis, the mass distribution and position of each mass element on its pivotal axis in relation to the axis of rotation satisfying the following conditions:

$$2f + \frac{|I_{y'} - I_{z'}| + 2|D_{y'z'}|}{mz'_{TP}} < 0.2z'_{TP}$$

where $f$=the distance between the pivotal axis x and the axis of the rotatable shaft;

$I_{y'}$=the inertial movement of the mass element with regard to a first axis y' which is at right angles to the pivotal axis x;

$I_{z'}$=the moment of inertia of the mass element with regard to a second axis z' at right angles to the first axis y' and the pivotal axis x, and passing through the center of gravity TP of the mass element;

$D_{y'z'}$=the deviation moment of the mass element with regard to the above-mentioned axes y' and z';

m=mass of the mass element; and $z'_{TP}$=the distance from the center of gravity of the mass element to the pivotal axis x along the second axis z';

the means for continuously varying including adjusting means axially displaceable in relation to the rotatable shaft, and driver means interacting with the adjusting means for changing the eccentric moment of the mass element in relation to the rotatable shaft, said rotatable shaft being tubular and limited axially by end plates each of which is equipped with a stub axle protruding outward from and coaxially with the rotatable shaft, the mass element being pivoted inside the rotatable shaft on a pivot shaft at right angles to the rotatable shaft and passing through the centerline thereof, and said adjusting means including a plate with a lengthwise central slot, axially displaceable inside the rotatable shaft, one end of which plate is connected with a control rod protruding through an axial hole in one stub axle into the rotatable shaft and the other end of which plate is adapted to slide on a locating stud, the locating stud protruding from the end plate at said other end and into the rotatable shaft, the pivot shaft of the mass element extending through the central slot of the plate at right angles to the rotatable shaft, the plate having a further slot arranged radially in relation to the rotatable shaft, and a driver bar being connected to the mass element parallel with the pivot shaft in engagement with the plate within the further slot.

* * * * *

UNITED STATES PATENT AND TRADEMARK OFFICE

CERTIFICATE OF CORRECTION

PATENT NO. : 4,221,499

DATED : September 9, 1980

INVENTOR(S) : Claes Breitholz and Rolf Dahlin

It is certified that error appears in the above-identified patent and that said Letters Patent are hereby corrected as shown below:

Column 3, line 22, "cos$\alpha$0.2z' " should read --cos$\alpha \leq$0.2z'--;

Column 4, line 44, "lenghtwise" should read -- lengthwise --;

Column 6, line 35, "claim 1" should read -- claim 5 --;

Column 6, line 42, "claim 1" should read -- claim 5 --;

Column 6, line 45, "claim 1" should read -- claim 5 --; and

Column 6, line 49, "claim 1 or 8" should read --claim 5 or 8--.

Signed and Sealed this

*Thirteenth* Day of *January 1981*

[SEAL]

*Attest:*

SIDNEY A. DIAMOND

*Attesting Officer* *Commissioner of Patents and Trademarks*